US009898414B2

(12) United States Patent
Radovic et al.

(10) Patent No.: US 9,898,414 B2
(45) Date of Patent: Feb. 20, 2018

(54) MEMORY CORRUPTION DETECTION SUPPORT FOR DISTRIBUTED SHARED MEMORY APPLICATIONS

(71) Applicant: Oracle International Corporation, Redwood Shores, CA (US)

(72) Inventors: Zoran Radovic, Stockholm (SE); Paul Loewenstein, Palo Alto, CA (US); John G. Johnson, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 296 days.

(21) Appl. No.: 14/530,354

(22) Filed: Oct. 31, 2014

(65) Prior Publication Data
US 2015/0278103 A1   Oct. 1, 2015

Related U.S. Application Data (60) Provisional application No. 61/972,082, filed on Mar. 28, 2014.

(51) Int. Cl.
*G06F 3/00*   (2006.01)
*G06F 12/0891*   (2016.01)
(Continued)

(52) U.S. Cl.
CPC ........ *G06F 12/0891* (2013.01); *G06F 11/073* (2013.01); *G06F 11/0724* (2013.01);
(Continued)

(58) Field of Classification Search
CPC .... G06F 3/0668; G06F 3/0651; G06F 3/0653; G06F 11/0724; G06F 11/073;
(Continued)

(56) References Cited

U.S. PATENT DOCUMENTS

| 4,817,140 A | 3/1989 | Chandra |
| 5,133,053 A | 7/1992 | Johnson |

(Continued)

FOREIGN PATENT DOCUMENTS

| EP | 2423843 A | 2/2012 |
| WO | WO 02/191125 A2 | 3/2002 |

(Continued)

OTHER PUBLICATIONS

Zhang, Long, "Attribute Based Encryption Made Practical" A Thesis Submitted in Partial Fulfillment of the Requirements for the Degree of Master of Science, dated Apr. 2012, 62 pages.

(Continued)

*Primary Examiner* — Reba I Elmore
(74) *Attorney, Agent, or Firm* — Hickman Palermo Becker Bingham LLP (57) ABSTRACT

Nodes in a distributed node system are configured to support memory corruption detection when memory is shared between the nodes. Nodes in the distributed node system share data in units of memory referred to herein as "shared cache lines." A node associates a version value with data in a shared cache line. The version value and data may be stored in a shared cache line in the node's main memory. When the node performs a memory operation, it can use the version value to determine whether memory corruption has occurred. For example, a pointer may be associated with a version value. When the pointer is used to access memory, the version value of the pointer may indicate the expected version value at the memory location. If the version values do not match, then memory corruption has occurred.

24 Claims, 7 Drawing Sheets

(51) Int. Cl.
  *G06F 12/02* (2006.01)
  *G06F 11/07* (2006.01)
  *G06F 3/06* (2006.01)
(52) U.S. Cl.
  CPC ........ *G06F 11/0763* (2013.01); *G06F 12/023* (2013.01); *G06F 3/0653* (2013.01); *G06F 3/0668* (2013.01); *G06F 2212/1044* (2013.01); *G06F 2212/621* (2013.01)
(58) Field of Classification Search
  CPC ............. G06F 11/0763; G06F 12/0891; G06F 12/023; G06F 13/1668; G06F 13/1694; G06F 2212/1044; G06F 2212/621
  USPC ........ 711/144, 148, 156, 170; 709/216, 225, 709/229; 707/638, 654, 686, 695, 752, 707/822; 714/11, 21, 27, 54, 763; 710/22, 28, 40, 104, 120; 712/14, 38, 712/225, 247; 713/153, 161
  See application file for complete search history.

(56) References Cited

U.S. PATENT DOCUMENTS

| | | | |
|---|---|---|---|
| 5,522,045 A | 5/1996 | Sandberg | |
| 5,561,799 A | 10/1996 | Khalidi | |
| 5,684,977 A | 11/1997 | Van Loo | |
| 6,148,377 A | 11/2000 | Carter et al. | |
| 6,151,688 A | 11/2000 | Wipfel | |
| 6,175,566 B1 | 1/2001 | Hahn | |
| 6,230,240 B1 | 5/2001 | Shrader | |
| 6,292,705 B1 | 9/2001 | Wang | |
| 6,295,571 B1 | 9/2001 | Scardamalia | |
| 6,757,790 B2 | 6/2004 | Chalmer | |
| 7,197,647 B1* | 3/2007 | Van Essen | H04L 63/0428 380/277 |
| 7,218,643 B1 | 5/2007 | Saito | |
| 7,664,938 B1* | 2/2010 | Tripathi | G06F 9/3802 712/220 |
| 8,255,922 B1 | 8/2012 | Fresko | |
| 8,504,791 B2* | 8/2013 | Cheriton | G06F 12/10 345/503 |
| 8,732,386 B2 | 5/2014 | O'Krafka | |
| 9,052,936 B1 | 6/2015 | Aron | |
| 9,083,614 B2 | 7/2015 | Falco | |
| 2002/0191599 A1 | 12/2002 | Parthasarathy | |
| 2003/0061417 A1 | 3/2003 | Craddock | |
| 2003/0105914 A1 | 6/2003 | Dearth | |
| 2004/0064653 A1* | 4/2004 | Gharachorloo | G06F 12/0826 711/145 |
| 2006/0095690 A1* | 5/2006 | Craddock | G06F 12/1475 711/153 |
| 2006/0098649 A1 | 5/2006 | Shay | |
| 2008/0010417 A1 | 1/2008 | Zeffer | |
| 2008/0065835 A1* | 3/2008 | Iacobovici | G06F 12/0817 711/141 |
| 2009/0037571 A1 | 2/2009 | Bozak | |
| 2009/0240664 A1 | 9/2009 | Dinker et al. | |
| 2009/0240869 A1* | 9/2009 | O'Krafka | G06F 12/0284 711/103 |
| 2010/0030796 A1 | 2/2010 | Netz et al. | |
| 2012/0011398 A1 | 1/2012 | Eckhardt | |
| 2013/0013843 A1* | 1/2013 | Radovic | G06F 11/073 711/5 |
| 2013/0036332 A1* | 2/2013 | Gove | G06F 21/52 714/54 |
| 2013/0191330 A1* | 7/2013 | Aronovich | G06F 17/30115 707/609 |
| 2013/0232344 A1* | 9/2013 | Johnson | G06F 12/1466 713/193 |
| 2014/0095651 A1 | 4/2014 | Kapil et al. | |
| 2014/0095805 A1 | 4/2014 | Kapil et al. | |
| 2014/0095810 A1 | 4/2014 | Loewenstein et al. | |
| 2014/0096145 A1 | 4/2014 | Aingaran et al. | |
| 2014/0115283 A1* | 4/2014 | Radovic | G06F 12/16 711/162 |
| 2014/0181454 A1 | 6/2014 | Manula | |
| 2014/0229440 A1 | 8/2014 | Venkatesh | |
| 2014/0279894 A1 | 9/2014 | Loewenstein et al. | |
| 2015/0227414 A1* | 8/2015 | Varma | G06F 11/073 714/47.1 |

FOREIGN PATENT DOCUMENTS

| | | |
|---|---|---|
| WO | WO 02/078254 | 10/2002 |
| WO | WO 2010/039895 A2 | 4/2010 |

OTHER PUBLICATIONS

Yu et al., "Attribute Based Data Sharing with Attribute Revocation", Proceedings of the 5th ACM Symposium, Apr. 13, 2010, pp. 261-271, New York, USA.
Wang et al., HyperSafe: A Lightweight Approach to Provide Lifetime hypervisor Control-Flow Integrity IEEE, dated 2010, 16 pages.
Wang et al., "Hierarchical Attribute-Based Encryption and Scalable User Revocation for Sharing Data in Cloud Servers", Computeres & Security 2011, vol. 30, No. 5, May 14, 2011, pp. 320-331.
Von Eicken et al., Active Messages: A Mechanism for Integrated Communication and Computation, dated 1992, ACM, 12 pages.
Ming et al., "An Efficient Attribute Based Encryption Scheme with Revocation for Outsourced Data Sharing Control",2011 Internat. Conference, Oct. 21, 2011, pp. 516-520.
Lee et al., "A Comprehensive Framework for Enhancing Security in InfiniBand Architecture", IEEE, vol. 18 No. 10, Oct. 2007, 14 pages.
Gao et al., "Application-Transparent Checkpoint/Restart for MPI Programs over InfiniBand", dated 2006, 8 pages.
Franke et al., "Introduction to the wire-speed processor and architecture" IBM J. Res & Dev. vol. 54 No. 1 Paper 3, dated Jan. 2010, 12 pages.
Cockshott et al., "High-Performance Operations Using a Compressed Database Architecture" dated Aug. 12, 1998, 14 pages.
Brewer et al., Remote Queues: Exposing Message Queues for Optimization and Atomicity, dated 1995 ACM, 12 pages.
Li et al., "Memory Coherence in Shared Virtual Memory Systems", ACM Transactions on Computer Systems, vol. 7, No. 4, dated Nov. 1989, 39 pages.
Lenoski et al., "The Directory-Based Cache Coherence Protocol for the DASH Multiprocessor", IEEE, dated 1990, 12 pages.
Kent, Christopher A., "Cache Coherence in Distributed Systems", dated Dec. 1987, Digital Western Research Laboratory, dated 1986, 90 pages.
Hardavellas et al., "Software Cache Coherence with Memory Scaling", dated Apr. 16, 1998, 2 pages.
Agarwal et al., "An Evaluation of Directory Schemes for Cache Cohrerence", Proceedings of the 15th Annual International Symposiumn on Computer Architecture, dated May 1988, 10 pages.
U.S. Appl. No. 13/828,555, filed Mar. 14, 2013, Office Action, dated Feb. 4, 2016.
U.S. Appl. No. 13/828,983, filed Mar. 14, 2013, Interview Summary, dated Jun. 23, 2016.
U.S. Appl. No. 13/828,983, filed Mar. 14, 2013, Advisory Action, dated Jul. 22, 2016.
Loewenstein, U.S. Appl. No. 13/828,555, filed Mar. 14, 2013, Interview Summary, dated Apr. 18, 2017.
Loewenstein, U.S. Appl. No. 13/828,555, filed Mar. 14, 2013, Adviosery Action, dated Apr. 21, 2017.
U.S. Appl. No. 13/828,983, filed Mar. 14, 2013, Notice of Allowance, dated Oct. 11, 2016.
Loewenstein, U.S. Appl. No. 13/828,983, filed Mar. 14, 2013, Notice of Allowance, dated Jan. 27, 2017.
Loewenstein, U.S. Appl. No. 13/828,555, filed Mar. 14, 2013, Final Office Action, dated Feb. 9, 2017.
U.S. Appl. No. 13/828,983, filed Mar. 14, 2013, Office Action, dated Oct. 1, 2015.

(56) References Cited

OTHER PUBLICATIONS

U.S. Appl. No. 13/839,525, filed Mar. 15, 2013, Notice of Allowance, dated Apr. 12, 2016.
U.S. Appl. No. 13/838,542, filed Mar. 15, 2013, Notice of Allowance, dated Apr. 7, 2016.
U.S. Appl. No. 13/828,983, filed Mar. 14, 2013, Final Office Action, dated May 16, 2016.
U.S. Appl. No. 13/828,555, filed Mar. 14, 2013, Interview Summary, dated Apr. 28, 2016.
U.S. Appl. No. 13/828,555, filed Mar. 14, 2013, Final Office Action, dated Jun. 30, 2016.
Zeffer et al., "TMA: A Trap-Based Memory Architecture", in ICS, dated 2006 Proceedings of the 20th Annual International Conference of Supercomputing, pp. 259-268.
Loewenstein, U.S. Appl. No. 13/828,555, filed Mar. 14, 2013, Office Action, dated Sep. 8, 2017

\* cited by examiner

MEMORY CORRUPTION DETECTION SUPPORT FOR DISTRIBUTED SHARED MEMORY APPLICATIONS

CROSS-REFERENCE TO RELATED APPLICATIONS; BENEFIT CLAIM

This application claims priority to U.S. Provisional Application No. 61/972,082, entitled "Memory Corruption Detection Support For Distributed Shared Memory Applications", filed by Zoran Radovic, et al. on Mar. 28, 2014, the contents of which are incorporated herein by reference. This application is related to U.S. patent application Ser. No. 13/838,542, filed on Mar. 15, 2013, entitled "MEMORY BUS PROTOCOL TO ENABLE CLUSTERING BETWEEN NODES OF DISTINCT PHYSICAL DOMAIN ADDRESS SPACES"; U.S. patent application Ser. No. 13/839,525, filed on Mar. 15, 2013, entitled "REMOTE-KEY BASED MEMORY BUFFER ACCESS CONTROL MECHANISM"; and U.S. patent application Ser. No. 13/828,555, filed on Mar. 14, 2013, entitled "MEMORY SHARING ACROSS DISTRIBUTED NODES"; the contents of each application in this paragraph is hereby incorporated by reference.

FIELD OF THE INVENTION

The present disclosure relates generally to techniques for detecting memory corruption in distributed node systems.

BACKGROUND

Many functionalities and services available over the Internet or over a corporate network are provided by one or more clusters of distributed computing nodes. For example, a database used to run a large scale business may be maintained by, and made available through, a plurality of database servers running on a plurality of distributed computing nodes that form a cluster. Using a cluster of computing nodes to provide a functionality or service may have a number of advantages. For example, with a cluster, it is relatively easy to add another node to increase the capacity of the system to meet increased demand. A cluster also makes it possible to load balance among the various nodes so that if one node becomes overburdened, work can be assigned to other nodes. In addition, a cluster makes it possible to tolerate failures so that if one or more nodes fail, the functionality or service is still available. Furthermore, nodes in a cluster may be able to share information in order to, for example, work together and carry out transactions, load balance, implement failure prevention and recovery, etc.

For applications that run on the cluster, memory corruption detection may be required. Memory corruption occurs when a memory location is inappropriately accessed or modified. One example of memory corruption occurs when an application attempts to advance a pointer variable beyond the memory allocated for a particular data structure. These memory errors can cause program crashes or unexpected program results.

Memory corruption detection schemes exist for single-machine applications. The single-machine memory corruption detection schemes allow a computer to track application pointers at run-time and inform a user of memory errors.

However, applications that run on clusters are more difficult than single-machine applications to debug. Some solutions exist for debugging applications running on clusters. Such debugging solutions may include in-house tool support, run-time support, or check-summing schemes. Unfortunately, these solutions complicate programming models and add performance overheads to a system and may not detect memory corruption.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments described herein, nodes in a distributed node system are configured to support memory corruption detection when memory is shared between the nodes. Nodes in the distributed node system share data in units of memory referred to herein as "shared cache lines." A node associates a version value with data in a shared cache line. The version value and data may be stored in a shared cache line in the node's main memory. When the node performs a memory operation, it can use the version value to determine whether memory corruption has occurred. For example, a pointer may be associated with a version value. When the pointer is used to access memory, the version value of the pointer may indicate the expected version value at the memory location. If the version values do not match, then memory corruption has occurred.

A pointer, as the term is used herein, is a value that contains an address to a memory location of another value stored in memory. The value is loadable into a register of processor. According to an embodiment, a pointer contains two separate values, a version value and a virtual address, which is translated to a physical address for execution of a memory operation.

The nodes in a distributed node system share portions of their main memory with other nodes in the system. A node ("source node") makes a portion of its main memory available for sharing with other nodes in the system, and another node ("remote node") copies the shared memory portion in its own main memory. A memory portion may comprise one or more shared cache lines. The remote node creates a copied cache line that is a copy of a source cache line in the source node.

In an embodiment, a shared cache line comprises version bits and data bits. The version bits of a shared cache line indicate a version value associated with the shared cache line. A pointer configured to point to the shared cache line also contains a version value. When the pointer is used to perform a memory operation on the shared cache line, the node compares the version value of the pointer to the version value indicated by the version bits of the shared cache line.

In an embodiment, the source node generates the version value in response to a memory allocation request. For example, if an application allocates memory for a data structure, the source node may generate a version value to be associated with that data structure. The generated version value and the associated data structure may be copied in the main memory of the local node.

In an embodiment, the memory operation is requested by an application. If a node detects that memory corruption has occurred, the node may inform the application of the error. The node may also terminate the memory operation rather than execute it.

In another embodiment, a node uses the version value to maintain coherency between nodes. For example, the version value in a remote cache line may indicate that the remote cache line is out of date. The remote node may then update the remote cache line from the corresponding source cache line. In an embodiment, one or more version values are reserved for indicating when the copied cache line is invalid. The one or more reserved version values are not used when a node generates a version value in response to a memory allocation request.

System Overview

Figure 1:
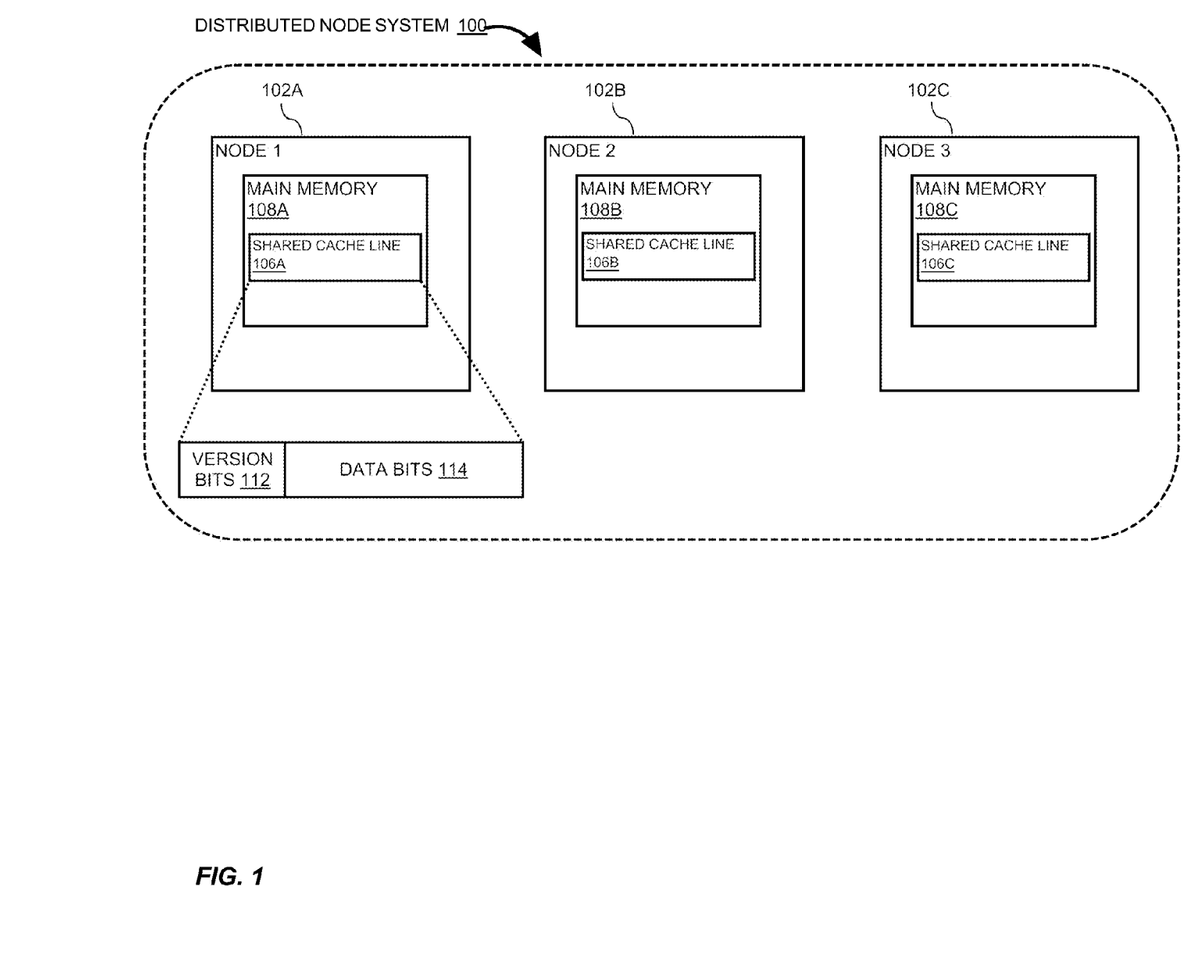
FIG. 1 is a block diagram that depicts an example distributed node system in an embodiment.

FIG. 1 shows a block diagram of an example distributed node system 100, in an embodiment. Distributed node system 100 includes three nodes: Node 1 102A, Node 2 102B, and Node 3 102C. Although three nodes are shown in the present illustration, system 100 may include more or fewer nodes.

Each node 102 includes a main memory 108. The main memory 108 includes one or more shared cache lines 106. In an embodiment, shared cache line 106 comprises version bits 112 and data bits 114. Data is stored in data bits 114. Version bits 112 indicate a version value associated with the shared cache line 106. Shared cache lines 106 may be the same size or the size may vary.

A node 102 may make a portion of its main memory 108 available for sharing with other nodes ("shared memory portion"). Another node 102 may allocate a portion of its main memory 108 ("copied memory portion") for duplicating the contents of the shared memory portion. In an embodiment, a node 102 may both make a portion of its main memory 108 available for sharing and may copy a portion of main memory 108 made available by another node 102. For purposes of the present invention, a node 102 may share any number of memory portions (zero or more) and may copy any number of shared memory portions (zero or more). Each memory portion may include one or more shared cache lines 106. In an embodiment, sharing or copying a portion of main memory 108 includes, respectively, sharing or copying the one or more shared cache lines 106.

Figure 2:
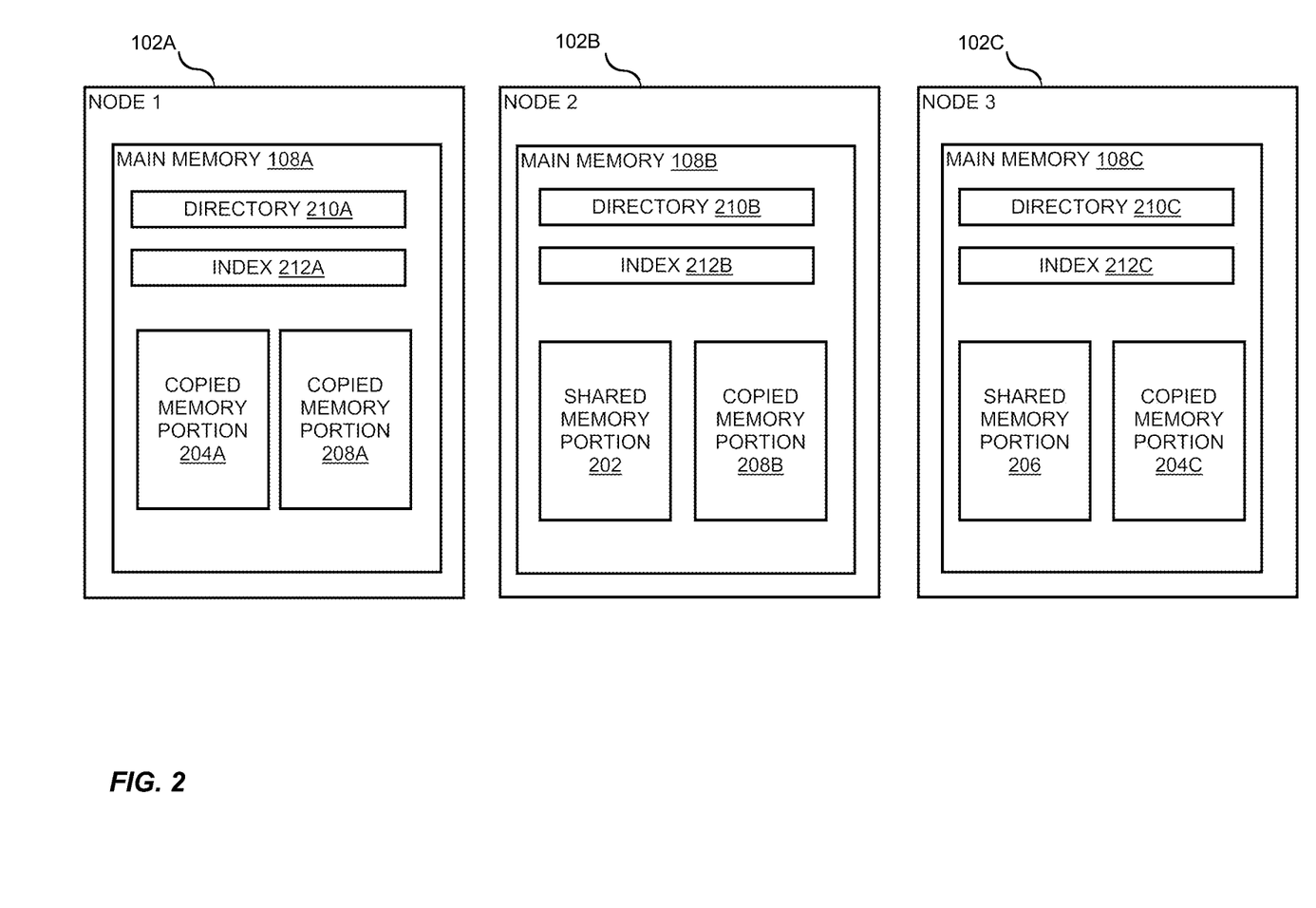
FIG. 2 illustrates an example in which some nodes in a distributed node system are sharing memory, in accordance with an embodiment.

As an example, in FIG. 2, Node 2 102B is making a portion of its main memory 108B available for sharing with the other nodes. Nodes 1 and 3 are copying the shared memory portion 202. Thus, Node 1 102A has a memory portion 204A in its main memory 108A that is a copy of the shared memory portion 202, and Node 3 102C has a memory portion 204C in main memory 108C that is a copy of the shared memory portion 202. Node 3 102C is also making a portion of its main memory 108C available for sharing with the other nodes. Nodes 1 and 2 are copying the shared memory portion 206. Therefore, Node 2 102B has a memory portion 208B that is a copy of the shared memory portion 206, and Node 1 102A has a memory portion 208A that is a copy of the shared memory portion 206. In the illustrated example, Nodes 2 and 3 are both sharing a memory portion and copying a shared memory portion from another node. Node 1 is copying a memory portion from two nodes, but is not sharing a memory portion.

In an embodiment, a node 102 may include a directory 210. The directory 210 indicates, for each shared memory portion, which nodes in system 100 contain a copy of that shared memory portion. In an embodiment, the directory 210 contains an entry for each source cache line in the shared memory portion. That is, the directory 210 contains an entry for each shared cache line for which the node 102 is a source node.

In an embodiment, a node 102 may include an index 212. The index 212 indicates, for each shared memory portion, the location of the directory in main memory 108 of the shared memory portion. The index 212 also indicates, for each copied memory portion, the source node that shared the memory portion and the location of the shared memory portion in the main memory of the source node. In an embodiment, the index 212 contains an entry for each shared cache line in the main memory 108. The index 212 indicates, for each shared cache line in a copied memory portion, the source node that shared the source cache line and the location of the source cache line in the main memory of the source node.

System Initialization

In order to prepare the nodes 102 in system 100 to share memory, the nodes 102 are initialized. In an embodiment, the nodes 102 may be initialized in the manner described below. A node 102 may share any number of memory portions and may copy any number of memory portions shared by other nodes. Depending on what a node 102 decides to do, it may perform some, all, or none of the operations described.

During initialization, a node 102 determines whether it wishes to make any portion of its main memory 108 available for sharing with other nodes in the system 100. If it does, the node 102 broadcasts information to the other nodes 102 indicating its willingness to share a portion of its main memory. The information broadcasted may include information about the node 102, the size of the shared memory portion 202, as well as where the memory portion 202 is located on the main memory 108. The information indicates to other nodes in the system 100 where to access the shared memory location.

A node 102 may receive broadcasted information indicating that another node wishes to share a portion of its main memory. In response to receiving the broadcasted information, the node 102 may decide whether to copy or not to copy the shared memory portion 202. If the node 102 decides to copy the shared memory portion, the node will allocate a copied memory portion sufficient to store a copy of the shared memory portion.

In an embodiment, the node 102 does not populate the allocated memory with data. That is, the node only allocates the memory, but does not copy data from the shared memory portion. The node sets the version value for each copied cache line in the copied memory portion to a value that indicates the copied cache lines are invalid. In an embodiment, a node 102 will not copy the data from the shared memory portion into its copy of the memory portion until an application requests the data. When the node attempts to execute an operation that targets the copied cache line, the version value will indicate to the node that the shared cache line is invalid. The node may then copy the source cache line from the shared memory portion into the copied cache line in the copied memory portion.

In an embodiment, if node 102 is sharing a portion of its main memory 108, the node allocates memory in main memory 108 for storing a directory structure 210. The directory structure 210 indicates which nodes contain a copy of each memory portion shared by node 102. In an embodiment, the directory structure 210 comprises a directory entry for each shared cache line that is in the shared memory portion. In other words, each source cache line is associated with a directory entry. Thus, the directory entries indicate, for each source cache line, which other nodes have a copied cache line that should be a copy of that source cache line. In an embodiment, the directory entry may also indicate whether each copied cache line in the remote nodes is a valid (up-to-date) copy. In an embodiment, the directory entry may include a lock to serialize access to the directory entry.

In an embodiment, node 102 allocates memory in its main memory 108 for an index structure 212. The index structure 212 comprises an index entry for each shared cache line in main memory 108. If the node 102 is sharing a shared cache line in a shared memory portion, the index entry indicates the location in main memory 108 of the directory entry for the shared cache line. If the shared cache line is in a copied memory portion, the index entry indicates the source node that shared the shared memory portion and the location of the corresponding source cache line in the main memory of the source node. In an embodiment, the node 102 updates the index structure 212 if it decides to copy a shared memory portion upon receiving broadcasted information from a source node. The information received from the source node may correspond to information stored in the index structure 212.

Exemplary Memory Allocation

In an embodiment, node 102 assigns a version value to a memory location when the memory is allocated. For example, when an application performs a malloc request, the node 102 allocates the requested amount of memory, generates a version value to associate with the allocated memory, and returns a pointer to the application. In an embodiment, the allocated memory location comprises one or more shared cache lines. A version value may be indicated by the version bits of each shared cache line.

In an embodiment, the version value is generated by the heap manager of the application. The version value may be chosen from a range of valid values. In an embodiment, one or more version values are used to indicate when a shared cache line is invalid, and are not included in the range of valid values to choose from. The format of the version value may vary depending on the implementation. For example, the version value may be four bits long, resulting in sixteen possible values. In another example, the version value may be a 44-bit time stamp.

The version value is also associated with the pointer to the allocated memory. In an embodiment, a pointer includes both a version value and a virtual address. For example, a node might use 44-bit registers to store a pointer, but the virtual address does not use the entire 44 bits. The version value may be stored in extra unused bits of the 44-bit register.

If the allocated memory is being shared as part of a shared memory portion, other nodes 102 may copy the shared cache lines in the allocated memory location into their respective copied memory portions. In an embodiment, copying the shared cache lines includes copying the associated version value. The other nodes 102 may also generate pointers to the copied shared cache lines. A version value may be stored in association with each generated pointer.

Pointer-Based Memory Corruption Detection

Figure 3:
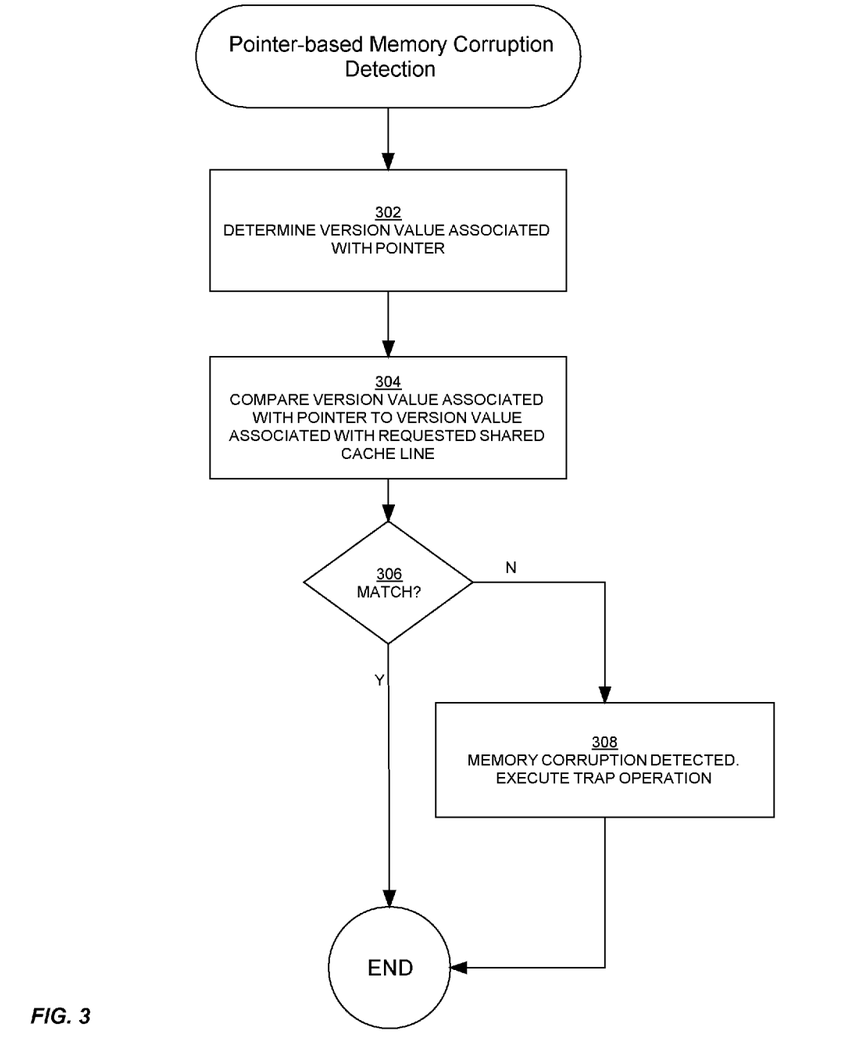
FIG. 3 is a flow diagram that depicts a procedure for detecting memory corruption in a node, in an embodiment.

FIG. 3 is a flowchart illustrating a procedure for detecting memory corruption in a node 102 using a version value associated with a pointer. The procedure may performed when performing a memory operation involving a shared cache line referred to by a pointer, where the pointer is associated with a version value. The procedure may be referred to hereafter as pointer-based memory corruption detection.

For example, node 102 receives a command from an application. The command may be, for example, a request to execute a memory operation such as a load or a store command. During execution of the command, the node 102 executes steps for detecting memory corruption. The command may include a pointer to a shared cache line in main memory 108. As discussed above, in an embodiment, when the node 102 allocates memory to an application, the node returns a pointer that is associated with a version value.

In step 302, the node 102 determines the version value associated with the pointer included with the command. In an embodiment, the pointer includes the version value. The version value associated with the pointer may indicate a version value the command expects to be associated with the requested shared cache line. For example, if the command is using the pointer to access a data structure, the version value may be associated with the data structure.

In step 304, the node 102 compares the version value of the pointer with a version value associated with the requested shared cache line. In an embodiment, the version bits of the shared cache line indicate the version value associated with the shared cache line. The method then proceeds to decision block 308.

At decision block 308, if the version value of the pointer does not match the version value associated with the requested shared line, memory corruption is detected. In an embodiment, a trap operation is executed. The trap operation may include indicating to the application that a memory corruption was detected. The trap operation may also include terminating execution of the memory operation. Alternatively, the procedure ends and the memory operation proceeds.

If the version value of the pointer matches the version value associated with the requested shared line, then the procedure ends and the memory operation proceeds.

The procedure for detecting memory corruption using a version value associated with a pointer illustrated in FIG. 3 may be performed while performing various kinds of memory operations. Such memory operations shall be described in further detail.

Coherency Between Nodes

In an embodiment, a version value in a shared cache line may also be used to manage coherency of shared cache lines between nodes. When a source node updates a source cache line, the copied cache lines in the remote nodes will be out of date. However, the remote nodes may not immediately update their copied cache lines. Instead, the version value of each copied cache line is set to indicate that the copied cache line is invalid. Later, if the remote node attempts to access the copied cache line, the node will see that the copied cache line is invalid and will update the copied cache line.

In an embodiment, when a node 102 executes a store command, it may execute a trap operation. In an embodiment, the node 102 will execute different steps depending on whether the target shared cache line is a source cache line or a copied cache line. If the target shared cache line is a copied cache line, then the node 102 will propagate the store to the source cache line in the source node. In an embodiment, a remote node may record the store in a store buffer prior to sending the store to the source node.

In an embodiment, the node 102 contains an index 212. If the requested shared cache line is a copied cache line, the index entry will indicate the source node and location of the source cache line for the copied cache line. Thus, the node 102 may reference the index 212 to determine whether the requested shared cache line is a copied cache line or a source cache line. Based on the determination, the node 102 may determine which steps to take to execute the store command.

Remote Node Load

Figure 4:
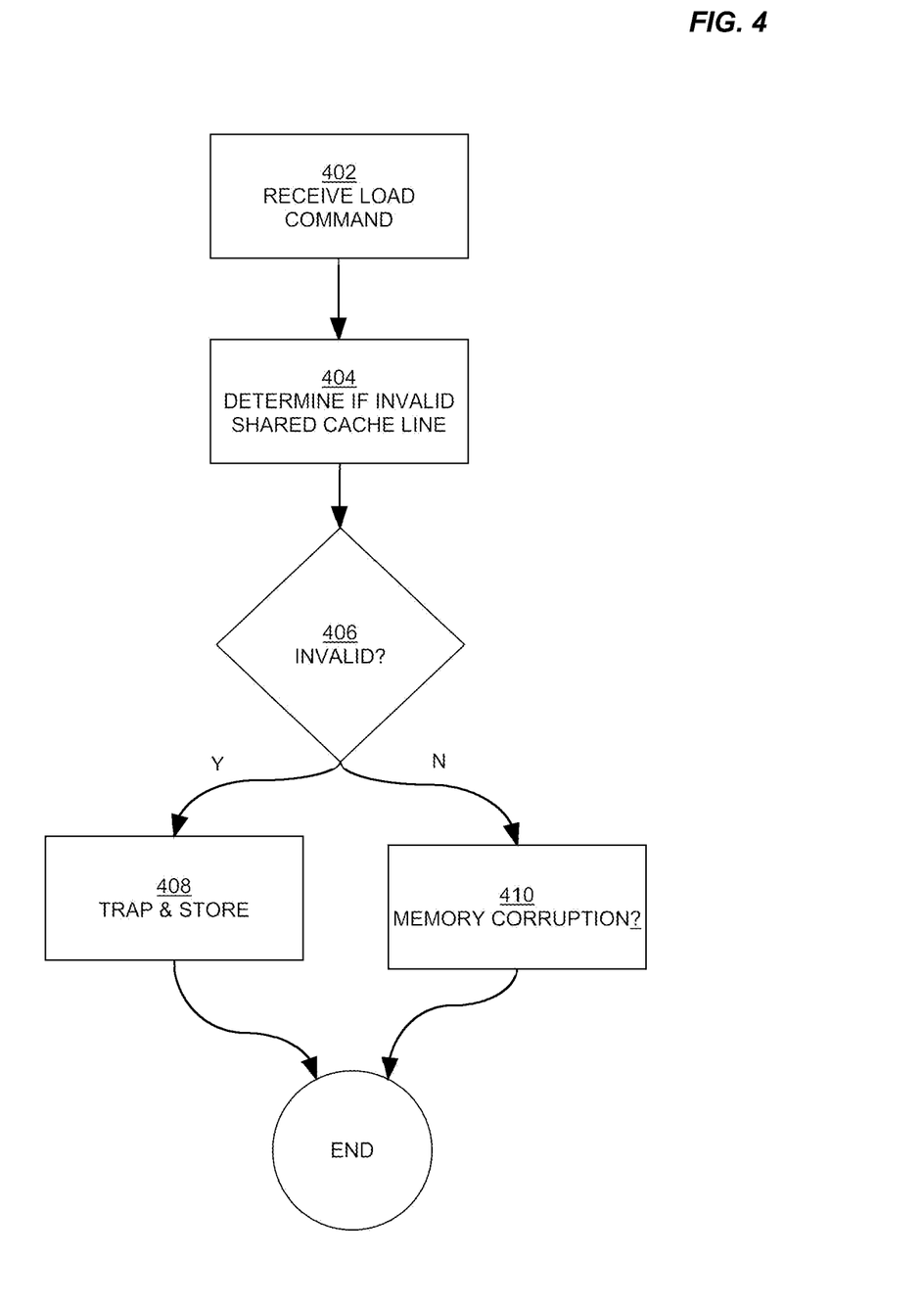
FIG. 4 is a flow diagram that depicts a procedure for updating a cache line when loading the cache line while detecting memory corruption, in an embodiment.

In an embodiment, nodes do not update a copied cache line when a source node updates a corresponding source cache line. A node may only update the copied cache line when the copied cache line is loaded at the node. The version value indicating that copied cache line is invalid triggers the updating. When the copied cache line is updated, memory corruption detection is performed. FIG. 4 is a flowchart illustrating a procedure for updating a shared cache line when a copied cache line is requested in a node 102.

In step 402, node 102 receives a command from an application. For example, the command may be a memory operation involving a load operation, such as a load command.

The command may include a pointer to a shared cache line in main memory 108. As discussed above, in an embodiment, when the node 102 allocates memory to an application, the node returns a pointer that is associated with a version value. For purposes of this illustration, it will be assumed that the pointer included with the command is associated with a version value.

In step 404, node 102 determines whether the version value indicates that the shared cache line is invalid. In an embodiment, at least one version value is used to indicate the shared cache line is invalid and is not used during memory allocation. In an embodiment, the shared cache line is a copied cache line. The version value may indicate the shared cache line is invalid if, for example, the copied cache line has not been populated with data from the source cache line. The requested shared cache line may or may not be a copied cache line.

In one example, the shared cache line is not a copied cache line. In an embodiment, a shared cache line that is not in a copied memory portion is presumed to always be valid.

In another example, the shared cache line is a copied cache line. The data in the shared cache line may be out of date. That is, the data in the copied cache line is not the same as the data in the source cache line. This may occur, for example, when a source node stores data to the source cache line.

The method then proceeds to decision block 406. At decision block 406, if the version value indicates that the shared cache line is valid, the node 102 continues execution of the procedure and proceeds to step 410, where pointer-based memory corruption detection is performed.

If the version value indicates that the shared cache line is invalid, the method proceeds to step 408. In step 408, the node suspends execution of the command and executes a trap operation.

In an embodiment, the trap operation includes copying a source cache line to the copied cache line. Copying the source cache line may include copying the version bits and the data bits of the source cache line. Therefore, after the copy is performed, the version value of the copied cache line is set to the version value from the source cache line. The data in the copied cache line is set to the most recent data contained in the source cache line as modified by any stores to the copied cache line made by the remote node recorded to the store buffer that have not been propagated to the source cache line. Thus, the node is able to update the data in the shared cache line in order to maintain coherency with other nodes.

In an embodiment, the node contains an index 212. The node may use an index entry corresponding to the requested shared cache line in order to determine which source node contains the corresponding source cache line and where the corresponding source cache line is located in the main memory of the source node.

In an embodiment, the source node contains a directory 210. When the remote node updates its copied cache line, the source node may update the directory entry for the corresponding source cache line to indicate that the copy at the remote node is a valid copy.

Remote Node Store

Figure 5A:
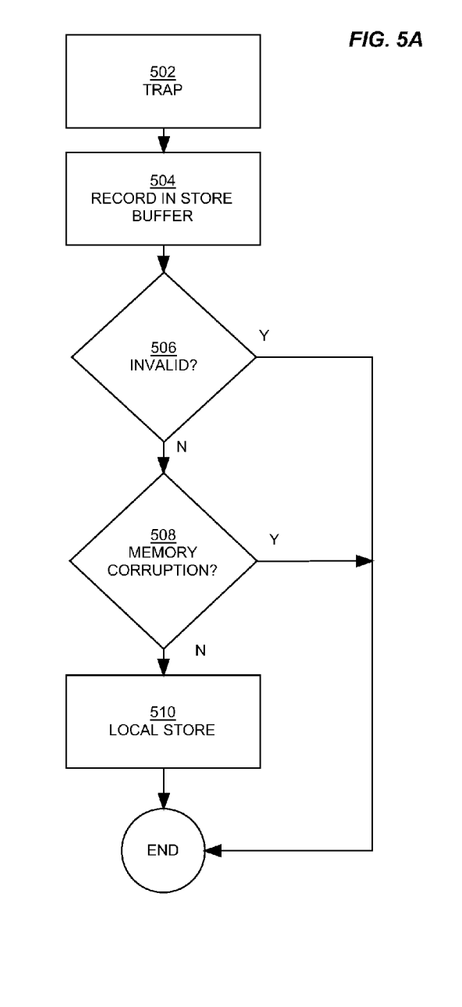
FIG. 5A is a flow diagram that depicts a procedure for performing a store in a remote node, in an embodiment.

As mentioned previously, in an embodiment, a remote node uses a store buffer to record a store before the store is sent to a source node. FIG. 5A is a flowchart illustrating a store performed by a remote node 102 in distributed node system 100. The store may be performed to execute a store command. The command may include a pointer to a copied cache line in main memory 108. The pointer may be associated with a version value.

In step 502, the node 102 suspends execution of the command and executes a trap operation to execute steps that follow.

At step 504, the store is recorded in a store buffer. The information recorded in the store buffer may indicate a memory location to which to perform the store and what data to store. Recording the store in a store buffer may include indicating the source node and the location of the source cache line in the main memory of the source node to which the store should be performed, the storing thread, and the version number associated with the store(s).

In an embodiment, the node 102 contains an index 212. The node may use an index entry corresponding to the requested shared cache line in order to determine which source node contains the corresponding source cache line and where the corresponding source cache line is located in the main memory of the source node.

In step 506, the node 102 determines whether the version value of the copied cache line indicates the copied cache line is invalid. If the version value indicates that the shared cache line is invalid, then the store is not performed to the shared cache line. If the value indicates that the copied cache line is valid, then the method proceeds to step 508.

At 508, the node 102 performs pointer-based memory corruption detection. If the pointer-based memory corruption detection performed by node 102 does not detect memory corruption, then the method proceeds to step 510.

At step 510, the node 102 stores the data in its shared cache line.

The trap operation ends.

Update Propagation

Figure 5B:
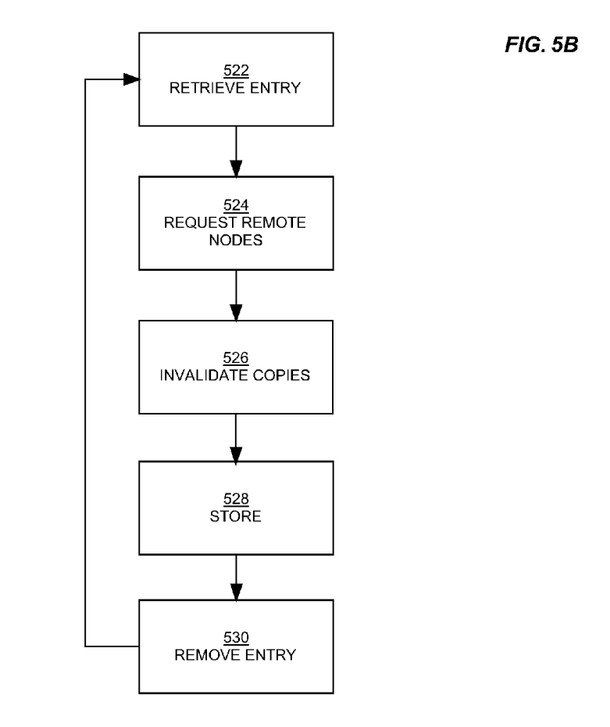
FIG. 5B is a flow diagram that depicts a procedure for propagating a store from a remote node to a source node, in an embodiment.

In an embodiment, a remote node records a store in its store buffer but does not send the store to a source node containing the corresponding source cache line. After the node records the store in its store buffer, the store needs to be propagated to the source node. Propagating the store may be performed as part of the same procedure as recording the store buffer or it may be performed separately. In an embodiment, the node may receive a command that includes a propagate stores operation. For example, the store command may include instructions to propagate the store. The store may be propagated after the trap operation is completed, as part of resuming execution of the store command. In another embodiment, the node 102 may check the store buffer for entries prior to writing to a shared cache line. FIG. 5B is a flowchart illustrating store propagation in the distributed node system 100. The store may be propagated asynchronously by another thread of execution.

At step 522, the node retrieves an entry from the store buffer. The entry may include information indicating a source node, a source cache line to which the store should be performed, the data to be stored, the version number associated with the store(s) and the storing thread.

At step 524, the node 102 requests from the source node a list of remote nodes for the source cache line. After receiving the information, the method proceeds to step 526.

In an embodiment, in response to the request, the source node refers to the directory entry for that shared cache line. The directory entry indicates which nodes contain a copy of the source cache line. Any number of nodes in system 100 may contain a copy of the source cache line. In an embodiment, when accessing the directory entry for the requested shared cache line, the source node locks the directory entry. In an embodiment, the source node only shares a list of remote nodes that contain a valid copy of the source cache line. The directory entry may be updated to indicate that all remote nodes contain an invalid copy.

At step 526, the node 102 causes other remote nodes that contain a copy of the source cache line to mark their copied cache line as invalid. The node indicates to each node that holds a respective copied cache line the data in the source cache line has been changed. The version value of the copied cache line at the remote nodes is changed to indicate that the copied cache line is invalid.

At step 528, the node 102 notifies the source node to perform the store. The notification may include the location of the source cache line in the main memory of the source node, the data to be stored in the source cache line and the version number. Before performing the store, the source node compares the version number from the store buffer to the version number in respective source cache line. If a version mismatch is detected, the source node does not perform the store and the issuing thread may be notified, for example via an asynchronous trap.

At step 530, the stored data is removed from the store buffer.

In an embodiment, the steps are repeated for each entry in the store buffer.

In an alternative embodiment, a remote node does not record the store in a store buffer. Instead, the remote node performs the update propagation steps during execution of the trap operation, in place of writing to the store buffer.

Source Node Store

Figure 6:
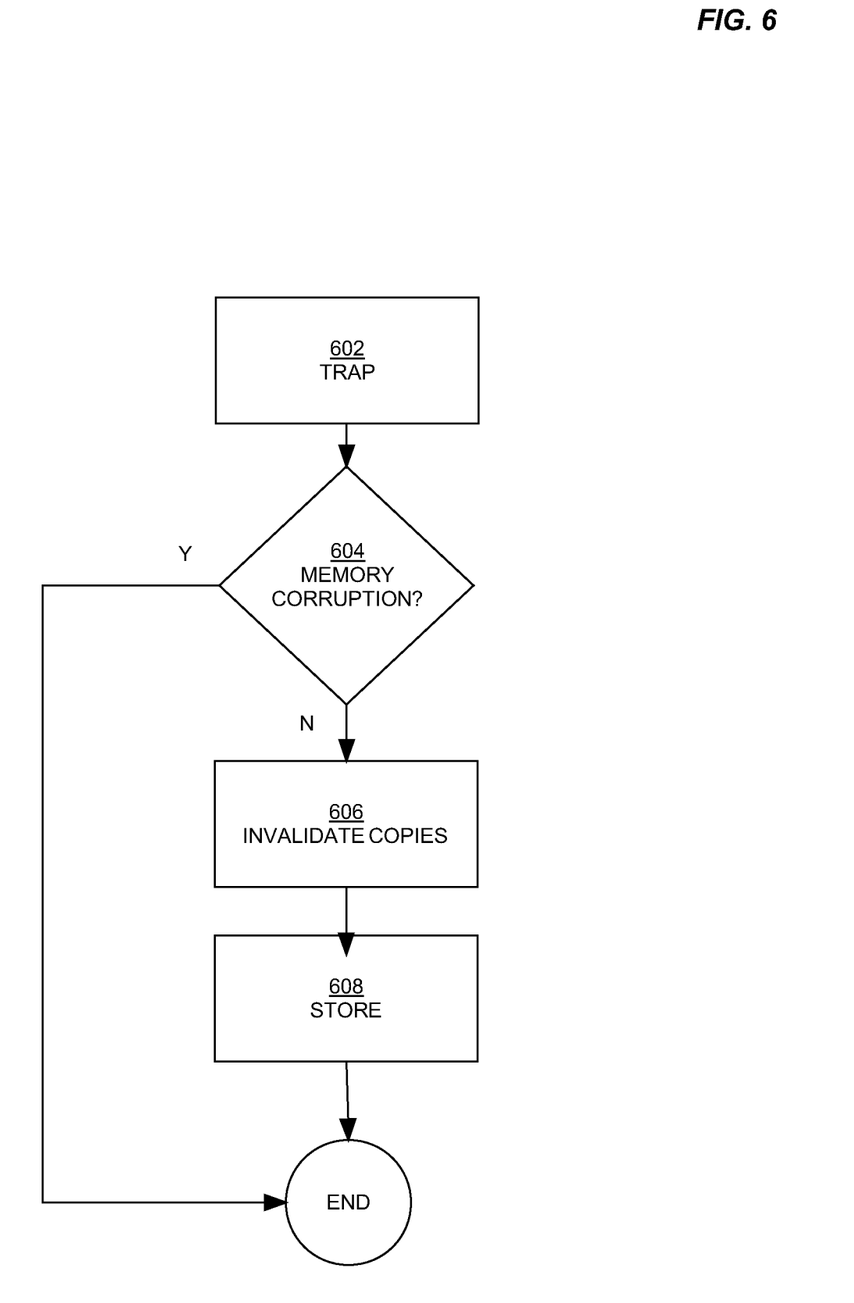
FIG. 6 is a flow diagram that depicts a procedure for performing a store in a source node, in an embodiment.

In an embodiment, the source node executes a store command to store a shared cache line without using a store buffer. FIG. 6 is a flowchart illustrating steps performed by a source node 102 to execute a store command in a distributed node system 100. The stored command may include a pointer to a source cache line in main memory 108. The pointer may be associated with a version value.

At step 602, the node 102 suspends execution of the store command and executes a trap operation.

At step 604, the node 102 performs pointer-based memory corruption detection for the source cache line. If no memory corruption is detected, then the method proceeds to step 606. If memory corruption is detected, then the method exits the trap operation without performing the store.

In step 606, the node 102 instructs the remote nodes to invalidate their respective copied cache lines. The node 102 indicates to each remote node that the data in the source cache line has been changed. The version value of the copied cache line at the remote nodes is changed to indicate that the copied cache line is invalid.

In an embodiment, the source node refers to the directory entry for that shared cache line. The directory entry indicates which nodes contain a copy of the source cache line. Any number of nodes in system 100 may contain a copy of the source cache line. The node indicates to each node that is copying the source cache line that the data has been changed. The version value of the copied cache line at the other nodes is changed to indicate that the copy of the source cache line is invalid.

In an embodiment, the invalidation of the source cache line is recorded and an instruction to the remote nodes to invalidate is sent lazily. For example, a thread other than a thread performing the store discovers the recording of the invalidated source cache line and sends instructions to the remote nodes to invalidate the copied cache line of the source cache line.

At step 608, the source node performs the store on the source cache line.

The source node completes the trap operation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
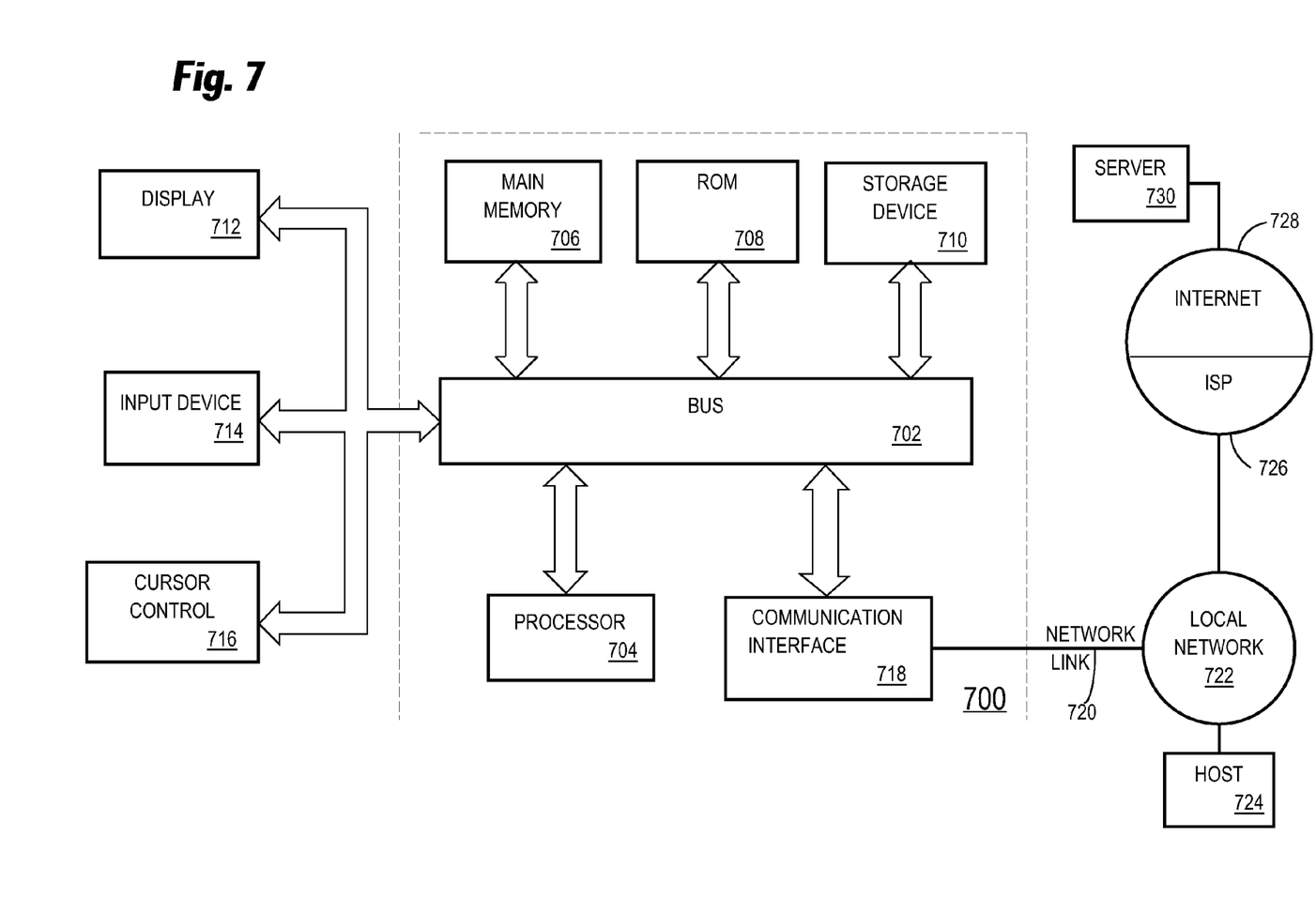
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the procedure steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   in a memory of a local node, generating a copied cache line that is a copy of a source cache line on a source node, wherein the said copied cache line comprises version bits and data bits, said version bits being set to a version value;
   generating a pointer that points to said copied cache line, said pointer having a pointer value that includes said version value;
   using said pointer to perform a memory operation on said copied cache line, wherein performing a memory operation includes:
      comparing the version value included in said pointer value to the version value to which the version bits of the copied cache line are set; and
      determining whether memory corruption has occurred based on the comparison.

2. The method of claim 1, wherein generating a copied cache line includes:
   determining a version value of the source cache line; and
   setting the version bits to the version value of the source cache line.

3. The method of claim 2, wherein the version value is generated by the source node in response to a memory allocation request.

4. The method of claim 1, wherein comparing the version value includes:
   determining whether the copied cache line is invalid; and
   in response to determining that the copied cache line is invalid, copying the source cache line to the copied cache line.

5. The method of claim 4, wherein the method further includes the steps of:
   the local node storing in a store buffer one or more updates to the copied cache line that have not been propagated to said source cache line; and
   further in response to determining that the copied cache line is invalid, propagating said one or more updates to said copied cache line.

6. The method of claim 1, further comprising:
   executing a trap operation if memory corruption has occurred.

7. The method of claim 6, wherein executing a trap operation includes:
   informing an application that memory corruption has occurred.

8. The method of claim 6, wherein executing a trap operation includes:
   terminating the memory operation.

9. One or more non-transitory storage media storing instructions which, when executed by one or more processors, cause performance of:
   in a memory of a local node, generating a copied cache line that is a copy of a source cache line on a source node, wherein the said copied cache line comprises version bits and data bits, said version bits being set to a version value;
   generating a pointer that points to said copied cache line, said pointer having a pointer value that includes said version value;
   using said pointer to perform a memory operation on said copied cache line, wherein performing a memory operation includes:
      comparing the version value included in said pointer value to the version value to which the version bits of the copied cache line are set;
      determining whether said copied cache line has been corrupted based on the comparison.

10. The one or more non-transitory storage media of claim 9, wherein generating a copied cache line includes:
    determining a version value of the source cache line;
    setting the version bits to the version value of the source cache line.

11. The one or more non-transitory storage media of claim 10, wherein the version value is generated by the source node in response to a memory allocation request.

12. The one or more non-transitory storage media of claim 9, wherein comparing the version value includes:
    determining whether the copied cache line is invalid;
    copying the source cache line to the copied cache line if the copied cache line is invalid.

13. The one or more non-transitory storage media of claim 12, wherein the instructions further include instructions for:
    the local node storing in a store buffer one or more updates to the copied cache line that have not been propagated to said source cache line; and
    further in response to determining that the copied cache line is invalid, propagating said one or more updates to said copied cache line.

14. The one or more non-transitory storage media of claim 9, further comprising:
    executing a trap operation if memory corruption has occurred.

15. The one or more non-transitory storage media of claim 14, wherein executing a trap operation includes:
    informing an application that memory corruption has occurred.

16. The one or more non-transitory storage media of claim 14, wherein executing a trap operation includes:
    terminating the memory operation.

17. A computer system, comprising:
    one or more computing nodes, wherein each computing node of the one or more computing nodes is configured to:
       in a memory of said each computing node, generate a copied cache line that is a copy of a source cache line on a source node belonging to said one or more computing nodes, wherein the said copied cache line comprises version bits and data bits, said version bits being set to a version value;

generate a pointer that points to said copied cache line, said pointer having a pointer value that includes said version value;

use said pointer to perform a memory operation on said copied cache line, wherein the memory operation includes:

to compare the version value included in said pointer value to the version value to which the version bits of the copied cache line are set; and to determine whether said copied cache line has been corrupted based on the comparison.

18. The system of claim 17, wherein to generate a copied cache line, each computing node of the one or more computing nodes is configured to:

determine the version value of said source cache line; and set the version bits to the version value of the source cache line.

19. The system of claim 18, wherein for each computing node of the one or more computing nodes, the version value is generated by a source node that is configured to generate the version value in response to a memory allocation request.

20. The system of claim 17, wherein for each computing node of said one or more computing nodes, to compare the version value, each computing node is configured to:

determine whether the copied cache line is invalid; and copy the source cache line to the copied cache line if the copied cache line is invalid.

21. The system of claim 17, wherein for each computing node of said one or more computing nodes, each computing node is configured to:

store in a store buffer one or more updates to the copied cache line that have not been propagated to said source cache line; and further in response to the determination that the copied cache line is invalid, propagate said one or more updates to said copied cache line.

22. The system of claim 17, wherein for each computing of said one or more computing nodes, to execute a trap operation, each computing node is configured to execute a trap operation if memory corruption has occurred.

23. The system of claim 22, wherein for each computing of node said one or more computing nodes, to execute a trap operation, each computing node is configured to inform an application that memory corruption has occurred.

24. The system of claim 22, wherein to execute a trap operation, each computing node of said one or more computing is configured to terminate the memory operation.

* * * * *

UNITED STATES PATENT AND TRADEMARK OFFICE
CERTIFICATE OF CORRECTION

Page 1 of 1

PATENT NO. : 9,898,414 B2
APPLICATION NO. : 14/530354
DATED : February 20, 2018
INVENTOR(S) : Radovic et al.

It is certified that error appears in the above-identified patent and that said Letters Patent is hereby corrected as shown below:

On the Title Page

On page 2, Column 2, item (56) under Other Publications, Line 37, delete "Cohrerence"," and insert -- Coherence", --, therefor.

On page 2, Column 2, item (56) under Other Publications, Line 38, delete "Symposiumn" and insert -- Symposium --, therefor.

On page 2, Column 2, item (56) under Other Publications, Line 48, delete "Adviosery" and insert -- Advisory --, therefor.

Signed and Sealed this
Ninth Day of October, 2018

Andrei Iancu
*Director of the United States Patent and Trademark Office*